(12) United States Patent
Francini

(10) Patent No.: US 6,801,303 B2
(45) Date of Patent: Oct. 5, 2004

(54) PROCESS FOR THE THREE DIMENSIONAL PRODUCTION OF IMAGES

(76) Inventor: Gino Francini, 13, Via F. Turati, Siena, Sinalunga (IT), I-53048

( * ) Notice: Subject to any disclaimer, the term of this patent is extended or adjusted under 35 U.S.C. 154(b) by 0 days.

(21) Appl. No.: 10/372,091

(22) Filed: Feb. 25, 2003

(65) Prior Publication Data

US 2003/0160950 A1 Aug. 28, 2003

(30) Foreign Application Priority Data

Feb. 26, 2002 (IT) .................................... AR2002A0006

(51) Int. Cl.[7] .......................... G03B 27/32; G03B 27/00; G03C 5/00; B44C 3/00
(52) U.S. Cl. ........................... 355/77; 355/18; 430/320; 156/59
(58) Field of Search ................... 355/18, 77; 430/320; 156/59

(56) References Cited

U.S. PATENT DOCUMENTS

| 3,287,193 | A | | 11/1966 | Klein |
| 3,880,686 | A | | 4/1975 | Robinson |
| 4,203,789 | A | * | 5/1980 | Delorme ...................... 156/59 |
| 5,182,063 | A | | 1/1993 | Lang et al. |
| 6,444,148 | B2 | * | 9/2002 | Harding ..................... 264/40.1 |
| 2001/0028123 | A1 | * | 10/2001 | Harding ..................... 264/40.1 |

FOREIGN PATENT DOCUMENTS

GB    1 454 785    11/1976

\* cited by examiner

*Primary Examiner*—Alan Mathews
(74) *Attorney, Agent, or Firm*—Young & Thompson

(57) ABSTRACT

A reproduction process filming the painting or photograph to be reproduced; preparing the support onto which the image will be reproduced by formation onto the support of a base coat or film, normally obtained with paints; projecting the image to be reproduced onto the support; carrying out brush strokes of paint originating reliefs over the base coat, duplicating the ones in relief on the projected image; placing the treated support in the printing machine by centering the image projected on it in order for the brush strokes in relief to coincide with the corresponding ones of the projected image; printing the imitated image onto the support over the base coat and the reliefs; and treating the reproduced image with transparent coats.

20 Claims, 1 Drawing Sheet

PROCESS FOR THE THREE DIMENSIONAL PRODUCTION OF IMAGES

BACKGROUND OF THE INVENTION

1. Field of the Invention

The invention relates to a process for the three dimensional reproduction of images, in particular of paintings and photographs.

2. Description of the Related Art

It is known that many copies of famous paintings are reproduced so that a number of collectors can possess the same image.

The reproductions are carried out by master copiers who reproduce the artwork in series imitating them almost to perfection, through manual painting.

Said reproductions are very similar to the originals, included the brush strokes in relief that give force and vigour to the images.

Said reproductions are very expensive when the master copier is very talented, therefore not all collectors of paintings can dispose of and enjoy copies reproduced with said techniques.

An alternative and less expensive process is that of printed reproductions. The printed copies are almost perfect. They can reproduce even the smallest details of the work of art and are sold at a very reasonable price.

These reproductions are easily recognisable and cold. The image does not seem to have a soul, without the vivacity given by brush strokes and therefore by the relief of colours. In particular, the reproductions of paintings by artists who give body to their works with rich thick colours in order for the painted surface to appear irregular, the reproductions appear cold and their sight does not satisfy an expert viewer.

SUMMARY OF THE INVENTION

The aim of the present invention is a process for mass reproductions which allows the creation of copies at a limited cost, which allows the duplication of even the smallest detail of the original work of art or in any case of the reproduced image, which allows the reproduction in a three dimensional format, where the brush strokes of the work being imitated are visible on the copy and, in the case in which the imitated work is a photograph, the copy should take on the aspect of painted portraits or in any case it should appear as if created with techniques and effects which are distinctive of paintings.

The invention which has permitted to obtain said results consists in a process which foresees:

filming the painting or photograph to be copied with a photographic method or by means of a scanner and consequent electronic memorisation of the image;

preparing the support on which the photographic and/or pictorial image will be reproduced, consisting in the formation onto said support of a base coat or film, capable of adhering onto the support in a stable way and of receiving the colours of a print;

projecting onto the support, prepared as described above, the image to be reproduced;

brushing thick paint, normally of a single colour, so as to summarily reproduce the brush strokes in relief present on the original painting being imitated, or creating thickening brush strokes on the image of the projected photograph;

positioning the treated support in the printing machine, with the centring of the image on it so as to create a perfect match with the corresponding brush strokes in relief;

printing the imitated image on the support;

treating the printed surface with the transparent coats to give a shine and/or glow to the reproduction.

Said type of process is particularly advantageous in that it allows the "industrial" production of copies which are faithful imitations of the original, are three dimensional, therefore not flat, have a surface treatment normally made with oil or transparent varnishes to hide the printing effect, and finally are of a very limited cost.

Another advantage of said process derives from the fact that the painting or photograph can be reproduced with dimensions that are very different from the original, while maintaining the perfect proportions of the parts which exist in the original work.

Another advantage derives from the fact that the reproduction can be carried out on different supports such as wood, canvas, cloth, glass, thick or thin plastic materials, considering that the printing operation is carried out on a prepared surface.

BRIEF DESCRIPTION OF THE DRAWINGS

The invention is described in detail here below with reference to the reproduction of a painting on a flat support, exemplified in the schematic drawings of the enclosed table, in which.

Figure 1:
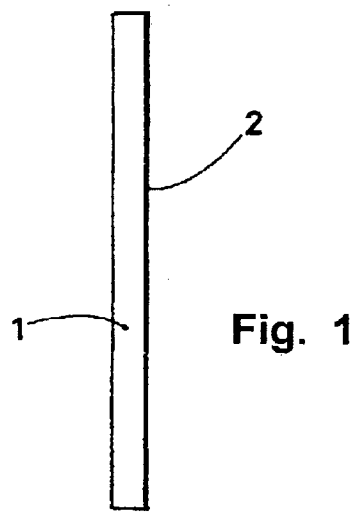
FIG. 1 is the side view of the flat support with a base coat or film on the surface that will receive the print.
Figure 2:
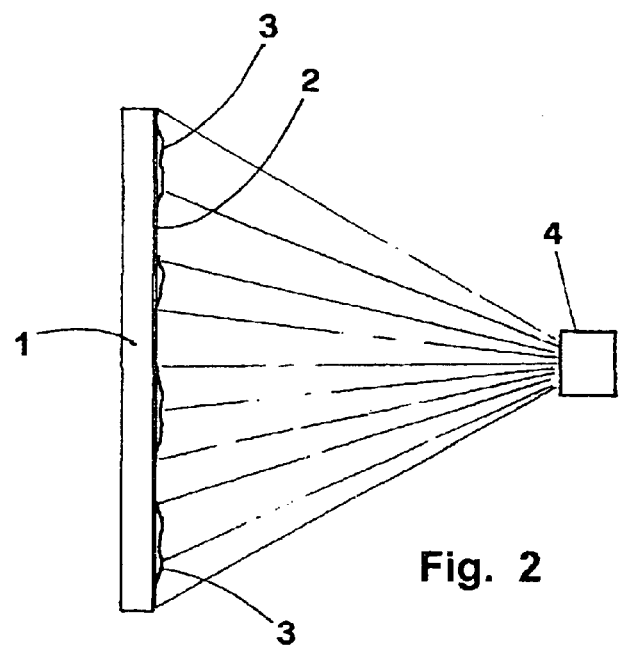
FIG. 2 is the side view of the support in FIG. 1, on which the image to be printed is projected and which will be used as a template for carrying out the relief brush strokes.
Figure 3:
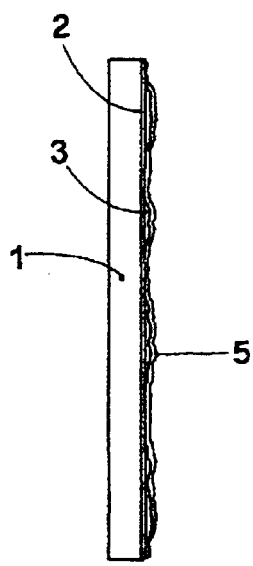
FIG. 3 is the side view of the support in FIG. 2 with the printed image covered by a transparent film which gives it a shine, glow and at any rate makes the reproduced image appear natural.

It is understood that the drawings have the sole aim of helping in the understanding of the sequence of phases through which the process, object of the present invention, is carried out, without constituting any limitation to it.

DETAILED DESCRIPTION OF THE PREFERRED EMBODIMENTS

The invention therefore consists of a sequence of phases which allow the reproduction of a three dimensional image on any support.

Said support can be of any type, thin or thick. Its surface made to receive the image is prepared by spreading over it a base coat 2 onto which the brush strokes of paint which originate reliefs 3 and the colours of the print can adhere permanently.

Normally, said base coat 2 is formed by spreading synthetic vinyl paint, or other material that can be rapidly spread or painted, adequate for a permanent adherence onto the surface of support 1 and at the same time allowing paints originating reliefs 3 and the printing colours to attach permanently to it and therefore to support 1.

Support 1, treated as described above and after it has dried out, is placed in front of projector 4 so that the image of the work of art to be reproduced is projected in it. During the projection the operator paints the support over the images projected on it in order to repeat the relief brush strokes visible on the imitated work of art, normally using monochromatic paints of the type that will permanently adhere onto base coat 2 spread over support 1 and form a valid printing base. Paints which are more or less thick and therefore can give origin to the reliefs over base coat 2 spread on support 1 and in any case brush strokes almost identical to the ones on the imitated work of art.

Following said operation support 1 is normally of a homogeneous colour and reliefs 3, originated by the brush strokes, are distributed as in the imitated work of art.

Said support 1 is therefore ready to receive the print which will appear on the same support 1 just like the transformation of a two dimensional print, as the one in ordinary printed reproductions, into a three dimensional duplication of the reproduced image.

Support 1, with reliefs 3, is positioned inside the printing machine.

A first projection of the image to be imitated allows the correct placement inside the printing machine of support 1, in such a way as to allow reliefs 3 to extend over the corresponding ones on the projected image. Once the correct positioning and centring of support 1 in the printing machine has been carried out, it is activated to transfer the colours of the imitated image onto surfaces 2–3, therefore obtaining a three dimensional reproduction.

The reproduction can be further refined with an oil treatment or with transparent varnishes with which shine and/or glow are given to the printed image, therefore to give vivacity to the print colours and make it appear like a work of art actually painted by a perfect master copier.

In the case of reproductions from photographs, reliefs 3 are carried out with fantasy, especially along the lines where colour changes take place. The subsequent centring inside the printing machine will follow a corresponding strategy.

During the operative phase, base coat 2 over support 1, on which the image to be copied will be reproduced, can nonetheless be diversified as long as said support 1 is made appropriate to receive firstly the spread reliefs 3, then the printed colours.

In the same way, the product spread over base coat 2, to create reliefs 3 which imitate the corresponding ones on the copied work of art, can be of any type, as long as it is capable of adhering onto base coat 2 and of receiving the print colours with which the copied image is reproduced.

What is claimed is:

1. A process for the three dimensional reproduction of images, comprising the sequential steps of:
    filming the image to be reproduced to create a copied image;
    preparing a support (1) on which the image to be copied will be reproduced in a three dimensional shape;
    shaping a base coat (2) on the support (1);
    projecting the copied image onto the base coat (2) and carrying in relief brush strokes on it, over the corresponding projected ones, through which the superficial unevenness characteristic of the copied image are reproduced over the base coat (2);
    placing the support (1) inside a printing machine and centering the brush strokes (3) over the corresponding ones of the projected image;
    printing the copied image on to the base coat (2) and on the reliefs (3) over the support (1).

2. The process, as claimed in claim 1, characterised by the fact that the base coat (2) over the support (1) is created with a product that adheres permanently to the support (1) and is adequate to receive print colours.

3. The process, as claimed in claim 1, characterised by the fact that the base coat (2) is monochromatic.

4. The process, as claimed in claim 1, characterised by the fact that the base coat (2) is made with a vinyl paint.

5. The process, as claimed in claim 1, characterised by the fact that the reliefs (3) over the base coat (2) are made with brush strokes of monochromatic paint.

6. The process, as claimed in claim 1, characterised by the fact that the image printed on the support (1) over the base coat (2) and over the reliefs (3) is treated with transparent films to give shine and/or glow to the three dimensional printed image.

7. The process of claim 1, wherein the images are at least on of paintings and photographs.

8. A process for the three dimensional reproduction of images of paintings and photographs, comprising the steps of:
    creating a copied image by photographing the image to be reproduced;
    preparing a support on which the image to be copied will be reproduced in a three dimensional shape;
    shaping a base coat on the support;
    projecting the copied image onto the base coat and carrying in relief brush strokes on the base coat, over the corresponding projected ones, through which the superficial unevenness characteristic of the copied image are reproduced over the base coat;
    placing the support inside an printing machine and centering the brush strokes over the corresponding ones of the projected image; and
    printing the copied image on to the base coat and on the reliefs over the support.

9. The process as claimed in claim 8, wherein the base coat is created with a product that adheres permanently to the support and is adequate to receive print colors.

10. The process as claimed in claim 8, wherein the base coat is monochromatic.

11. The process as claimed in claim 8, wherein the base coat is made with a vinyl paint.

12. The process as claimed in claim 8, wherein the reliefs over the base coat are made with brush strokes of monochromatic paint.

13. The process as claimed in claim 8, wherein the image printed on the support over the base coat and over the reliefs is treated with transparent films.

14. A process for the three dimensional reproduction of images, comprising the steps of:
    applying a base coat on a support at an area over which an image in a three dimensional shape will be produced;
    projecting the image onto the base coat to show projected brush strokes and carrying out relief brush strokes on the base coat, over corresponding projected brush strokes, through which superficial unevenness characteristics of the image are reproduced over the base coat by the formed relief brush strokes;
    placing the support inside a printing machine and centering the formed relief brush strokes over the corresponding projected brush strokes of the projected image; and
    printing the projected image onto the base coat and on the formed relief brush strokes on the support to create a three dimensional reproduction of the image.

15. The process as claimed in claim 14, wherein the base coat is created with a product that adheres permanently to the support and receives print colors.

16. The process as claimed in claim 14, wherein the base coat is monochromatic.

17. The process as claimed in claim 14, wherein, the base coat is made with a vinyl paint.

18. The process as claimed in claim 14, wherein the reliefs over the base coat are made with brush strokes of monochromatic paint.

19. The process as claimed in claim 14, wherein the image printed on the support over the base coat and over the reliefs is treated with transparent films.

20. The process as claimed in claim 14, wherein the image is one of a painting and a photograph.

\* \* \* \* \*